United States Patent [19]

Bateman

[11] E Patent Number: Re. 33,781

[45] Reissued Date of Patent: Dec. 31, 1991

[54] THERMALLY PROTECTIVE DRAPERY CONSTRUCTION FOR WINDOWS, SLIDING GLASS DOORS, GLASS WALL PANELS AND THE LIKE

[76] Inventor: Frank E. Bateman, 282 Hill Rd., Boxborough, Mass. 01719

[21] Appl. No.: 379,622

[22] Filed: Jul. 12, 1989

Related U.S. Patent Documents

Reissue of:

[64] Patent No.: 4,679,609
Issued: Jul. 14, 1987
Appl. No.: 880,331
Filed: Jun. 24, 1986

U.S. Applications:

[63] Continuation of Ser. No. 539,033, Oct. 5, 1983, abandoned, which is a continuation-in-part of Ser. No. 318,666, Nov. 5, 1981, abandoned.

[51] Int. Cl.[5] ..... A47H 5/32
[52] U.S. Cl. ..... 160/124; 160/123
[58] Field of Search ..... 160/123, 124, 348, 345, 160/349.1

[56] References Cited

U.S. PATENT DOCUMENTS

| | | | |
|---|---|---|---|
| 1,926,328 | 9/1933 | Chapman | 160/348 |
| 2,495,414 | 1/1950 | Herrington | 160/124 X |
| 3,321,781 | 5/1967 | Reich | 160/349.1 |
| 4,020,826 | 5/1977 | Mole | 160/DIG. 7 |
| 4,115,899 | 9/1978 | Ford | 160/345 |
| 4,167,205 | 9/1979 | Gerdeman | 160/123 |
| 4,188,991 | 2/1980 | Boyle . | |
| 4,390,055 | 6/1983 | Fenley | 160/348 |
| 4,679,609 | 7/1987 | Bateman . | |

*Primary Examiner*—Blair M. Johnson

*Attorney, Agent, or Firm*—Hamilton, Brook, Smith & Reynolds

[57] ABSTRACT

A thermally protective drapery construction comprises retaining rod means and inner and outer panels of drapery material arranged in suspended, separated relationship on the retaining rod means. The separated drapery panels are supported in a manner such that a thermally resistant critical air spacing is provided and extends between the panels and at a substantially uniform value. In the case of folds of respective inner and outer panels which are moved toward and away from one another along the retaining rod means, uniformity of the spacing is maintained during such movement.

The critical air spacing consists of a thermally resistant air space provided by locating the panels apart from one another a distance lying in a range of from 0.25 inches up to approximately 0.5 inches. Such a spacing between upper portions of the inner and outer panels of drapery material is achieved by securing together the panels with snap fastening carriers on the retaining rod and snap fastening tapes secured to the panels and attached to the carriers in spaced apart relation. Intermediate and lower portions of the inner panel also have fastened thereto fibrous separator means. The separator means may be of a thickness co-responding to the above-noted critical air spacing and extend into contact with the outer panel. The retainer rod means includes a heat cap attached by bracket means to a wall surface and located in closely spaced relation to upper edges of the drapery folds to constitute an air baffle which is maintained in effect when the drapery folds are opened and closed. The inner panel has a vertical edge seal which is also maintained when the inner and outer drapery folds are opened and closed and which permits access to a cord and pulley located between the panels without breaking the edge seal.

23 Claims, 8 Drawing Sheets

THERMALLY PROTECTIVE DRAPERY CONSTRUCTION FOR WINDOWS, SLIDING GLASS DOORS, GLASS WALL PANELS AND THE LIKE

Matter enclosed in heavy brackets [ ] appears in the original patent but forms no part of this reissue specification; matter printed in italics indicates the additions made by reissue.

This is a continuation of co-pending application Ser. No. 539,033 filed on Oct. 5, 1983 which is a continuation-in-part of Ser. No. 318,666 filed Nov. 5, 1981.

FIELD OF THE INVENTION

In the art is well known to employ insulating materials to be arranged on the inner surface of a wall structure which is exposed to relatively cold outside air, and in particular a wall surface having glass such as occurs in windows, sliding glass doors, glass wall panels and the like. It is recognized that wasteful flow of hat may take place by way of conduction, convection and radiation. Attempts have been made to prevent wasteful flow of heat in various ways and has, for example, been disclosed in U.S. Pat. Nos. 4,188,991, 4,020,826, 3,047,060, 1,926,328, 4,115,889, 2,609,043, 2,859,810, 3,388,734, 3,857,432, 4,077,072, 2,761,150, 2,391,150, 4,079,770 and 352,621. Copies of these patents are enclosed.

However, there has continued to be highly undesirable loss of heat in a great many buildings having relatively large glass areas, and the resistance factor of the various materials and arrangements proposed have failed to satisfactorily reduce undesirable flow of heat and, from an energy saving point of view, there is an increasing need for substantial improvement in appearance of insulating means which can be used with wall structures of the class indicated above so that they are acceptable to buyers.

SUMMARY OF THE INVENTION

The present invention relates to methods and means for providing a drapery construction having inner and outer panels of drapery material which are suspended from a retainer rod and secured together in uniformly separated relation, and to define a thermally resistant critical air space extending vertically between the panels.

It is a chief object of the invention to provide a drapery construction which includes inner and outer panels of drapery material attached together in uniformly separated relationship to define a thermally resistant critical air spacing lying in a range of from 0.25 inches up to 0.5 inches.

It is another object of the invention to devise a drapery construction having inner and outer drapery panels reversely folded in separated relationship to define a thermally resistant critical air spacing between the folds, and wherein means are provided for maintaining a critical air space at a uniform value when the folds are moved toward and away from one another.

Still another object is to provide a drapery construction having inner and outer panels attached together by snap fastenings and located apart a distance to provide a thermally resistant critical air space lying in a range of from 0.25 inches up to 0.5 inches and further characterized in that the inner and outer panels have located therebetween fibrous separator means of a thickness corresponding approximately to the critical air space.

Still another object of the invention is to combine with a drapery structure having inner and outer panels, a retaining rod and snap fastening carrier members and tapes for detachably securing the panels together in a manner such that a vertical edge seal of the inner panel with a wall surface may be maintained when adjacent folds of the inner and outer panels are opened and closed.

A further object of the invention is to provide an arrangement of spaced apart drapery panels and a retainer rod means attached to the panels by tapes and snap fastenings wherein the retaining rod means is supported in a heat cap which overlies upper edges of the panels in closely spaced relation thereto to constitute an air baffle which is maintained when the panels are opened and closed.

DETAILED DESCRIPTION OF THE INVENTION

Figure 1:
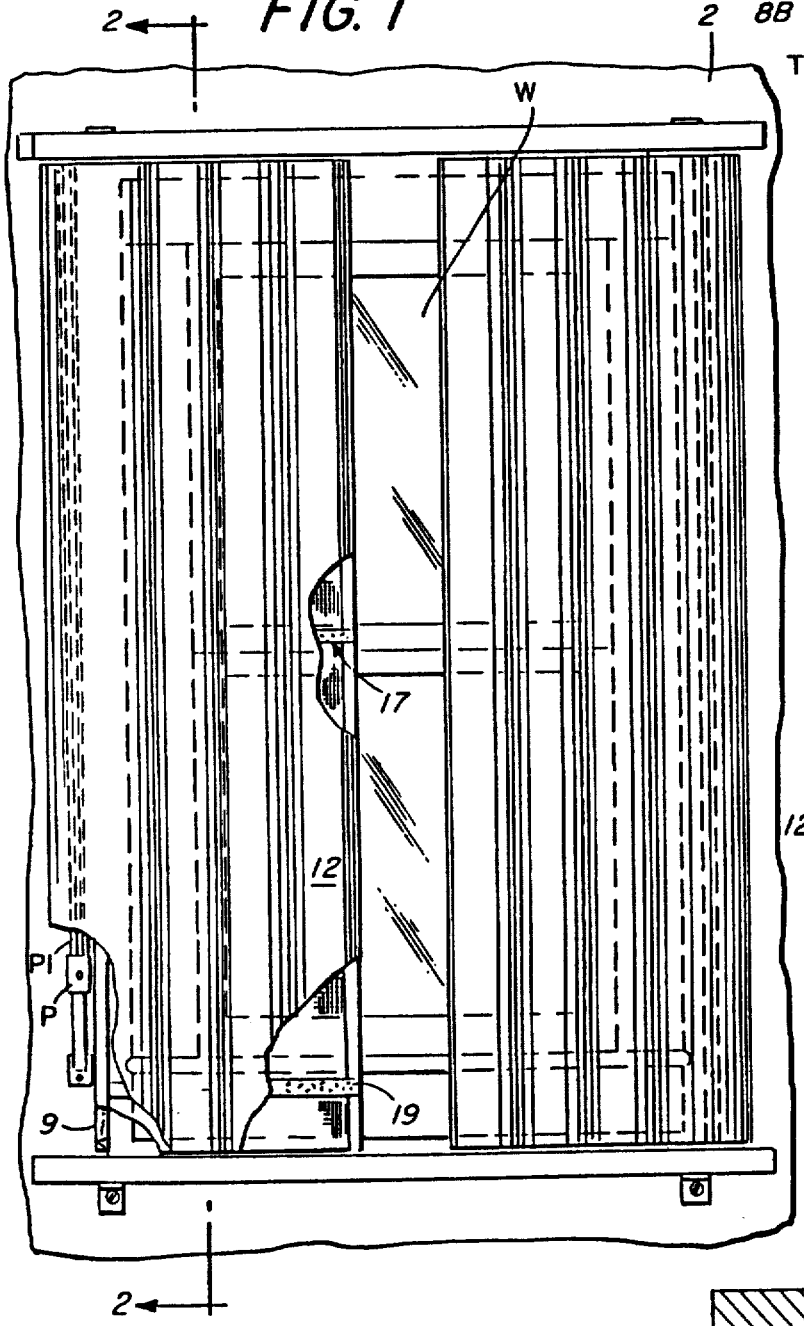
FIG. 1 is a front elevation illustrating the drapery construction suspended from a wall surface with portions broken away to indicate both the inner and outer panels as well as separator strip means.
Figure 2:
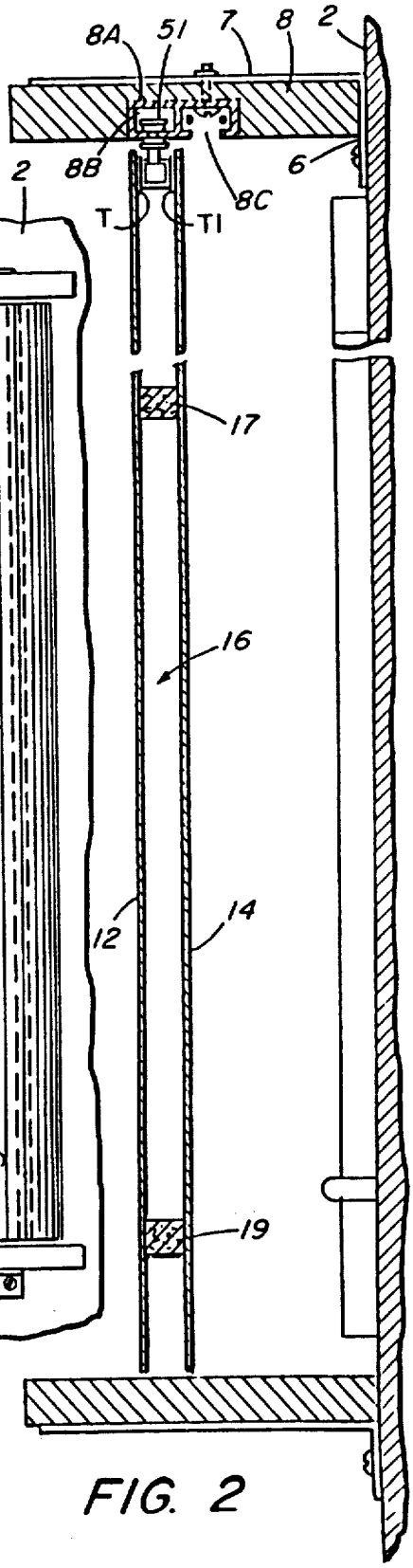
FIG. 2 is a vertical cross section taken on the line 2—2 of FIG. 1 and shows details of a heat cap, retaining rod means supported in the heat cap together with snap carrier members and snap fastening tapes attached at opposite sides of the snap carriers.

Attention is first directed to FIGS. 1 and 2 in which is illustrated a preferred embodiment of drapery construction of the invention. Included therein is a heat cap attached by brackets to a vertical wall surface and having a drapery rod supported at the underside of the heat cap. Two sets of panels enclose a window W. Each set includes inner and outer panels of drapery material arranged in suspended relationship on the retaining rod means by snap fastening tapes secured to the panels and attached to snap fastening carriers located at either side of the retaining rod. Only one set of inner and outer panels will be discussed and it will be understood that the second set of panels at the right hand side of FIG. 1 is similar.

Referring more in detail to FIGS. 1 and 2, numeral 12 denotes an outer panel of drapery material such as decorative drapery fabric. Numeral 14 denotes an inner panel which may, for example, be of a metallized heat reflective material or other desired material.

Figure 3:
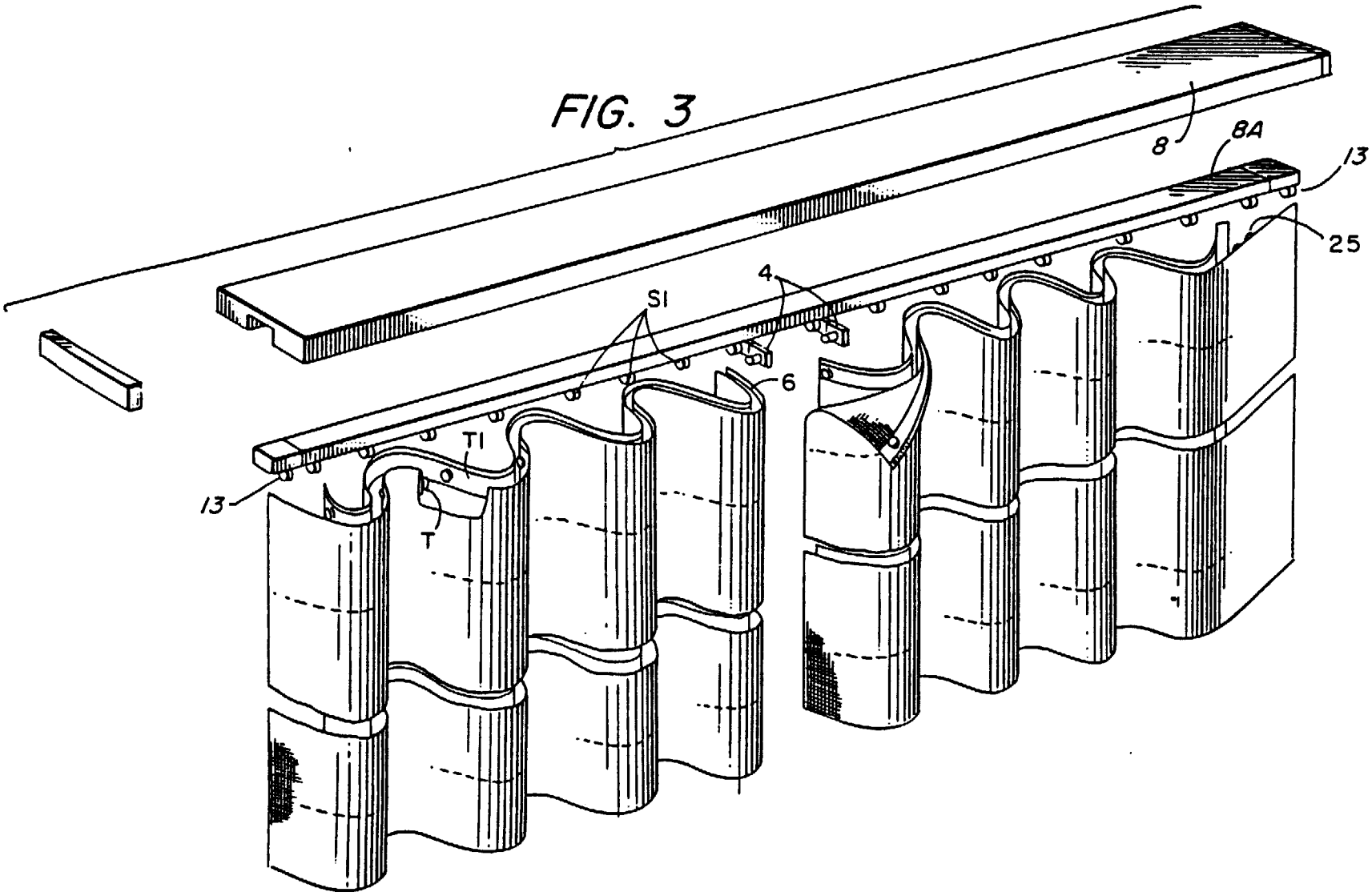
FIG. 3 is an exploded view indicating some of the components of FIGS. 1 and 2 in separated relationship and also indicating the critical air space of the invention lying therebetween.

As is more clearly shown in FIG. 2 the panels 12 and 14 are suspended from a retaining rod 8A which has snap fastening carrier members S1 in sliding contact therewith. Retaining rod 8A is received in a channelled heat cap 8 transversely fastened by brackets as 7 to a vertical wall surface 2. Upper portions of panels 12 and 14 are attached together by snap fastening tapes T and T1 secured thereto and having snap fastenings detachably secured at opposite sides of the carrier members to define a thermally resistant, vertically extending critical air space, denoted by numeral 16. The critical air space 16 is provided by locating the panels apart a distance lying in a range of from 0.25 inches up to 0.5 inches. In FIG. 3 the heat cap 8 and the retaining rod 8A are shown in separated relation and folds of respective panels 12 and 14 and the critical air spacing 16 are also shown.

From a further inspection of FIG. 2 it will be noted that retainer rod 8A is formed with a channel 8B in which a set of snap carriers as S1 and snap fastening tapes T and T1 are received. A pulley P and cord assembly P1 is shown in FIG. 1 and is received in a channel 8C of the retaining rod.

Figure 9:
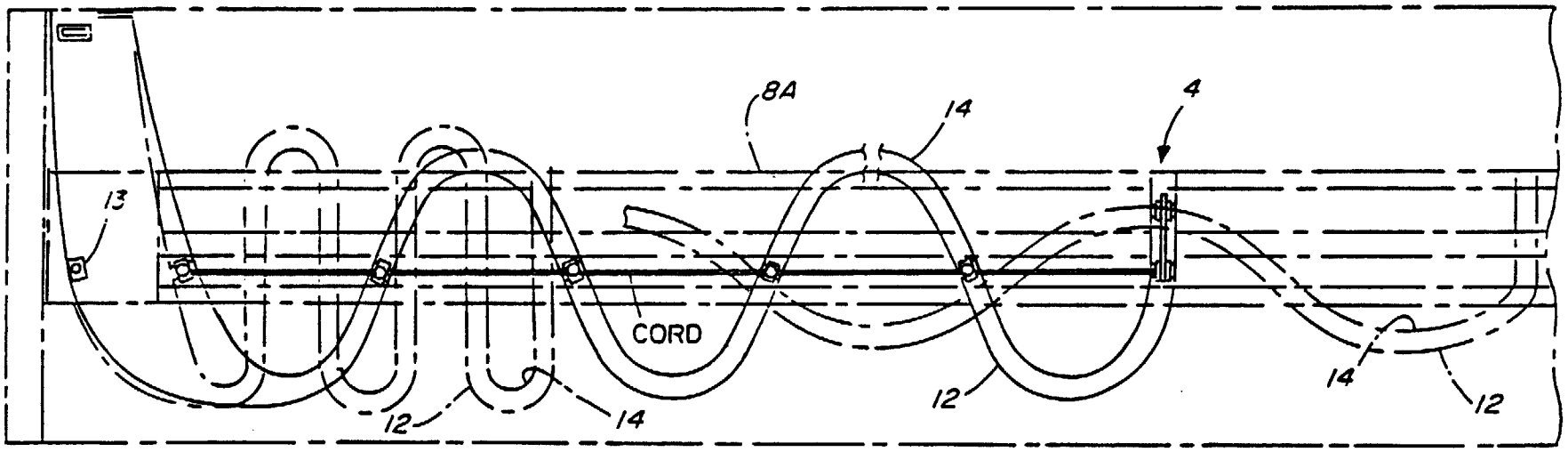
FIG. 9 is a plan view of a retaining rod assembly and tapes.

Master carrier members provide for manually moving the carrier elements whether a pulley and cord is desired or not. It will be understood that each of the carrier elements is connected to an adjacent snap carrier by cords as shown in FIG. 9, the length of the cords being substantially equal and the cords forming the chords of the drapery arcs and although the channelled retainer 8A may be separately mounted at the under side of the heat cap 8, as shown in FIG. 2, it may be desired to have the retainer rod and its channels molded as an integral part of the heat cap.

In thus supporting inner and outer panels on snap fastenings which are attached to snap fastening carrier members in sliding contact with the retainer rod difficulty may be experienced in maintaining the critical air space between the folds at a uniform value and particularly when the folds are to be opened and closed. If, as is customarily done, the inner and outer panels are chosen of the same linear width and snap fastenings are located at equal distances apart on each of the tapes, it is found that at some points the inner panel will come into contact with the outer panel and the critical air spacing is no longer present and thermal resistivity is lost. Also, as the panels are hung from their upper edges, there is a tendency for intermediate and lower portions of the panels to move together.

In accordance with the invention, means are provided for maintaining the upper portions of the inner and outer panels in uniformly spaced relationship and means are also provided for maintaining uniform spacing of the intermediate and lower portions of the panels.

In one preferred embodiment of the drapery construction of the invention there may be considered, for example, a specific window size of 36"×63". For this window size the retaining rod 8A may have a length of 40 inches to permit space for the edge seal and pulley (FIGS. 1 and 10) and the panels 12 and 14 may have a width of 44¾ inches in each instance. On the retainer rod may be provided a set of snap fastening carrier members S1 and the set may consist of a number of snap fastening carrier members and two master carriers (4), as shown in the two-way draw embodiment of FIG. 3.

Figure 12:
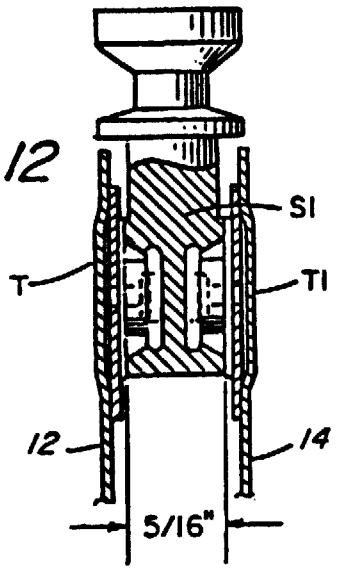
FIG. 12 is a detail cross section of carrier construction.

One of the carrier members S1 is shown in detail in FIG. 12 wherein the width of the carrier is chosen to be 5/16 inches, i.e. 0.31 inches. From an inspection of this figure it will be seen that when snap fastenings are attached at opposite sides of the carrier, the distance 0.31 inches determines the distance at which panels 12 and 14 are to be spaced apart.

Figure 5:
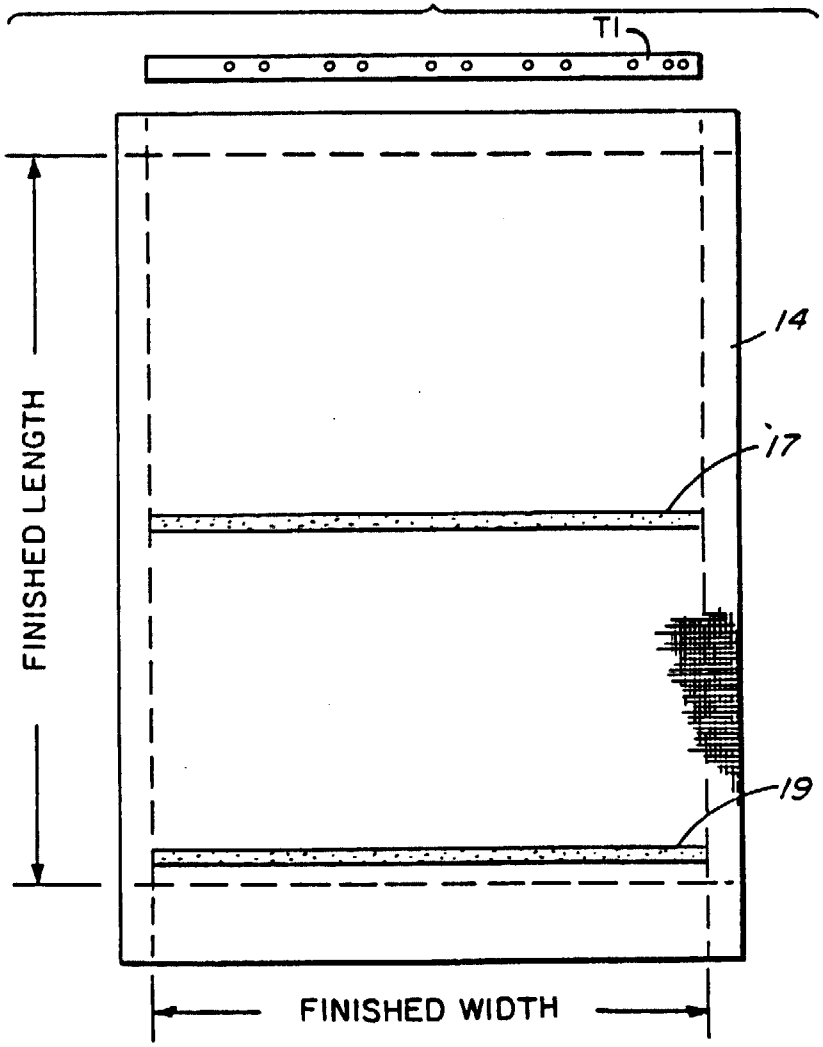
FIG. 5 is an elevational view of an inner drapery panel illustrating separator strips fastened thereto.
Figure 4:
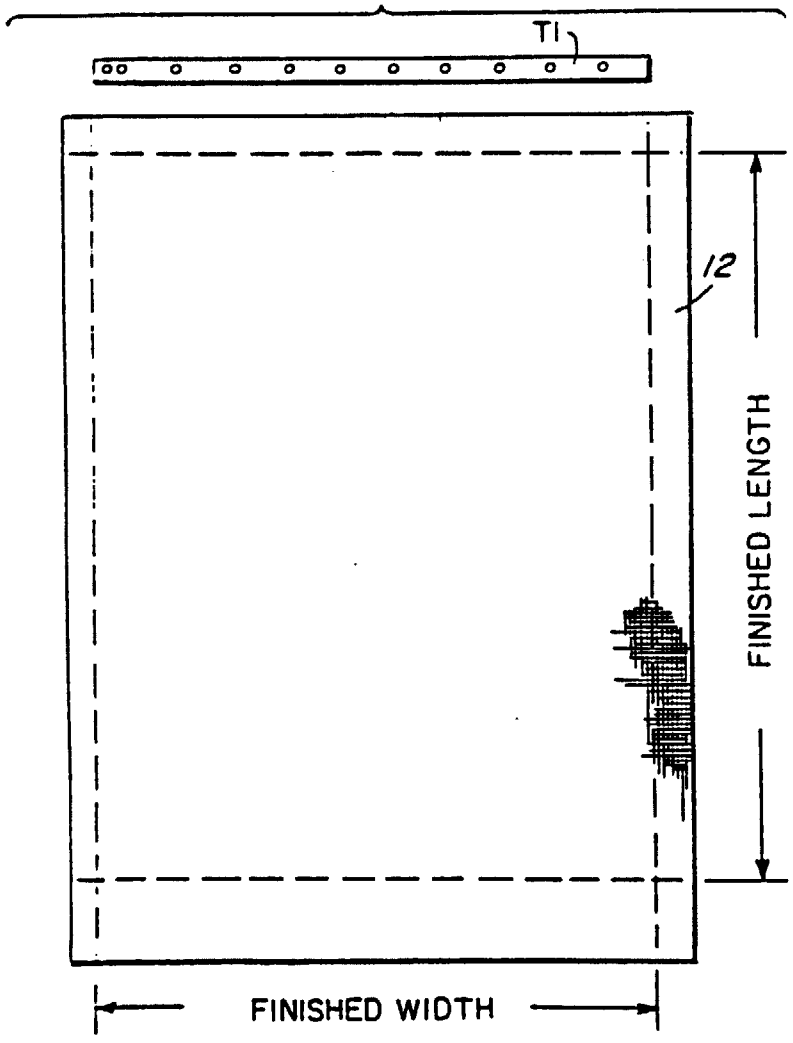
FIG. 4 is an elevational view of an outer drapery panel.
Figure 6:
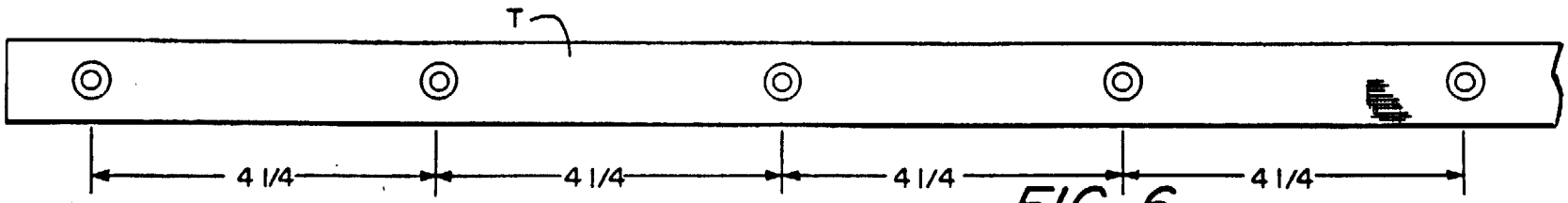
FIG. 6 is a detail elevational view of a drapery snap and tape arrangement for the outer panel.

The tapes T and T1 may be of a length corresponding to the width of the panels and are fastened to the panels as illustrated in FIGS. 4 and 5 and in the case of Tape T snap fastenings may be located at equally spaced distances of, for example, 4¼ inches, i.e. 4.25 inches.

It has been determined that in arranging two reversely folded panels apart from one another a distance which is to be maintained at a uniform value, reverse folds of one of the panels must have arcuate sections of uniform length. Reverse folds of the other panel must have compensating alternate lengths alternately less than and greater than the alternate length of one of the folds of the first noted panel. In addition it is pointed out that each of the compensating arcuate lengths is a function of the distance the panels are to be spaced apart.

The value of such compensating arcuate lengths are, in accordance with the invention, mathematically derived. It will be understood that the reverse folds of the two panels may occur with varying configurations especially as they are moved toward and away from one another, and in one specific instance the folds may be of a semi-circular configuration.

Figure 13:
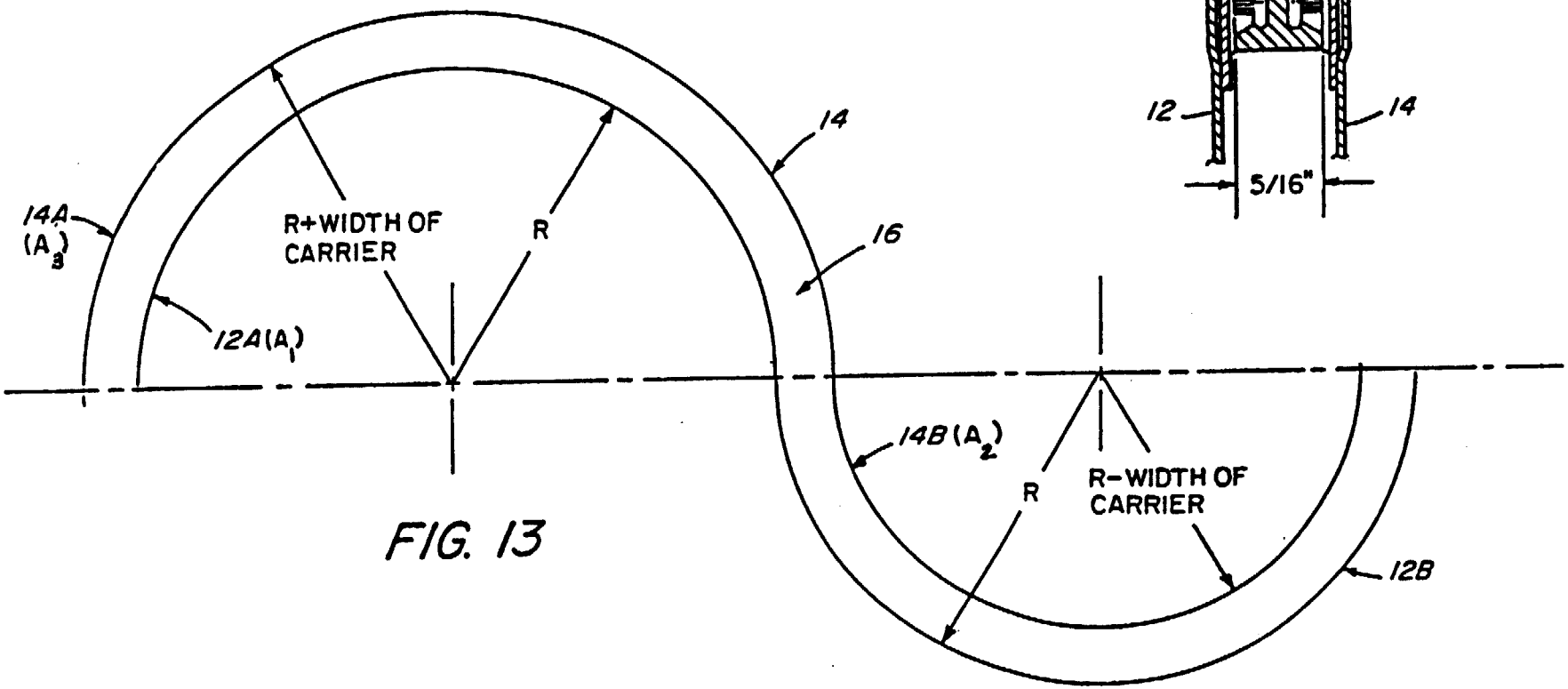
FIG. 13 is a diagrammatic view of the panels.

In FIG. 13 folds 12A and 12B of panel 12 are indicated as semi-circular having a radius R and circumference $[A^1]A_1$. In such case $$[A^1]A_1=\pi R \quad R=[A^1]A_1/\pi$$

Referring to the dimensions of the several components specified above, the arcuate length of 12A, in one instance, has been chosen to be 4.25 inches and therefore R=4.25/3.1416 or 1.35 inches.

From a further inspection of FIG. 13, it will be seen that in the case of panel 14 arcuate fold 14A ($[A^3]A_3$) is of an arcuate length greater than the arcuate length of fold 12A, while arcuate fold 14B ($[A^2]A_2$) is of an arcuate length less than the length of fold 12B.

Thus, for inner panel 14 there is required to be provided compensating arcuate lengths alternately less than and greater than the arcuate length of the outer panel 12A, i.e. 4.25 inches, and the compensating arcuate lengths are a function of the distance apart at which the panels are located.

The spacing of the panels (S) has been established by the width of the snap fastening carriers earlier specified as 5/16 inches 0.31 inches which may be seen in FIG. 12.

Figure 7:
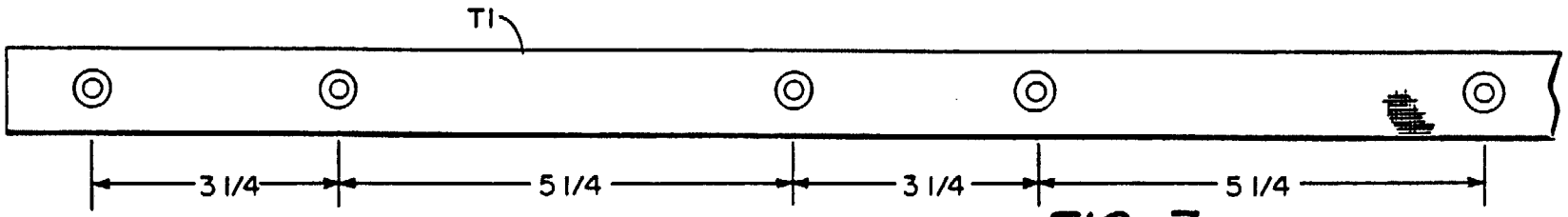
FIG. 7 is another elevational view showing a drapery snap and tape for use with an inner drapery panel.
Figure 8:
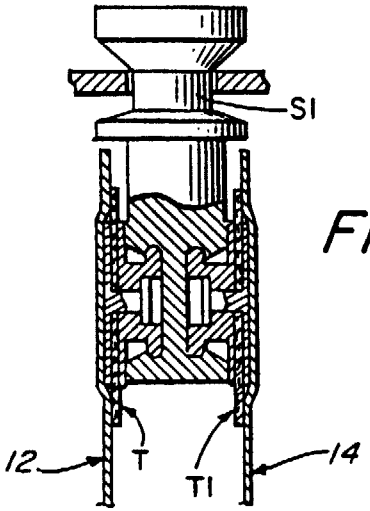
FIG. 8 is a detail cross-sectional view of snap carriers and tapes.

The formula for determining the compensating arcuate length of arc 14B is $$[A^2]A_2=(R-S)=3.1416\times(1.35-0.31)=3.27$$

inches, as shown in FIG. 7.

The formula for determining the the compensating arcuate length for arc 14A is $$[A^3]A_3=(R+S)=3.1416\times(1.35+0.31)=5.22$$

inches, as is also shown in FIG. 7.

For practical purposes, these spacings can be rounded off to occur as 3¼ inches and 5¼ inches.

Therefore, the snap fastenings located at these compensating distances from the tape T1 will provide compensating lengths of the inner panel 14 to maintain the spacing of 0.31 inches.

As earlier noted, a further important feature of the invention is the provision of separator means for maintaining uniformity of the critical air spacing of the invention and in one desirable form the separator means may consist of separator strips as 17 and 19 shown in FIGS. 1, 2, 5, 10 and 11. Although two separator strips are shown, it may be desired to employ larger numbers, particularly in the case of dealing with larger sizes of window areas. When the panels are assembled on the retaining rod means the spacing strips extend into contact with the outer panel folds, as suggested in FIG. 2, thus insuring uniformity of spacing of the panels at their intermediate and lower portions, particularly when the folds of the respective panels are moved toward and away from one another. In addition to strips transversely disposed, there may also be provided stips otherwise disposed between the panels 12 and 14.

The drapery construction as now disclosed has been found to provide, by means of the critical air spacing, a thermal resistance which is highly effective in preventing heat transfer by conduction and is comparable to the thermal resistance of rigid foam insulation of the same thickness.

In further support of the authenticity of a critical air spacing lying in a range of from 0.25 inches up to 0.5 inches, there is attached at the end of the specification technical data including a text excerpt taken from the publication Thermal Shutters and Shades by William Shurcliff; chart data from the publication Movable Insulation by William Langdon, 1980; and data specified by the Commonwealth of Massachusetts for drapery systems for heat storage walls.

In addition to means for providing a critical air spacing and maintaining uniformity of the spacing at substantially all points, the invention drapery structure may also be constructed to provide edge sealing with a wall surface and also air baffle means located at the top of the panels.

Figure 10:
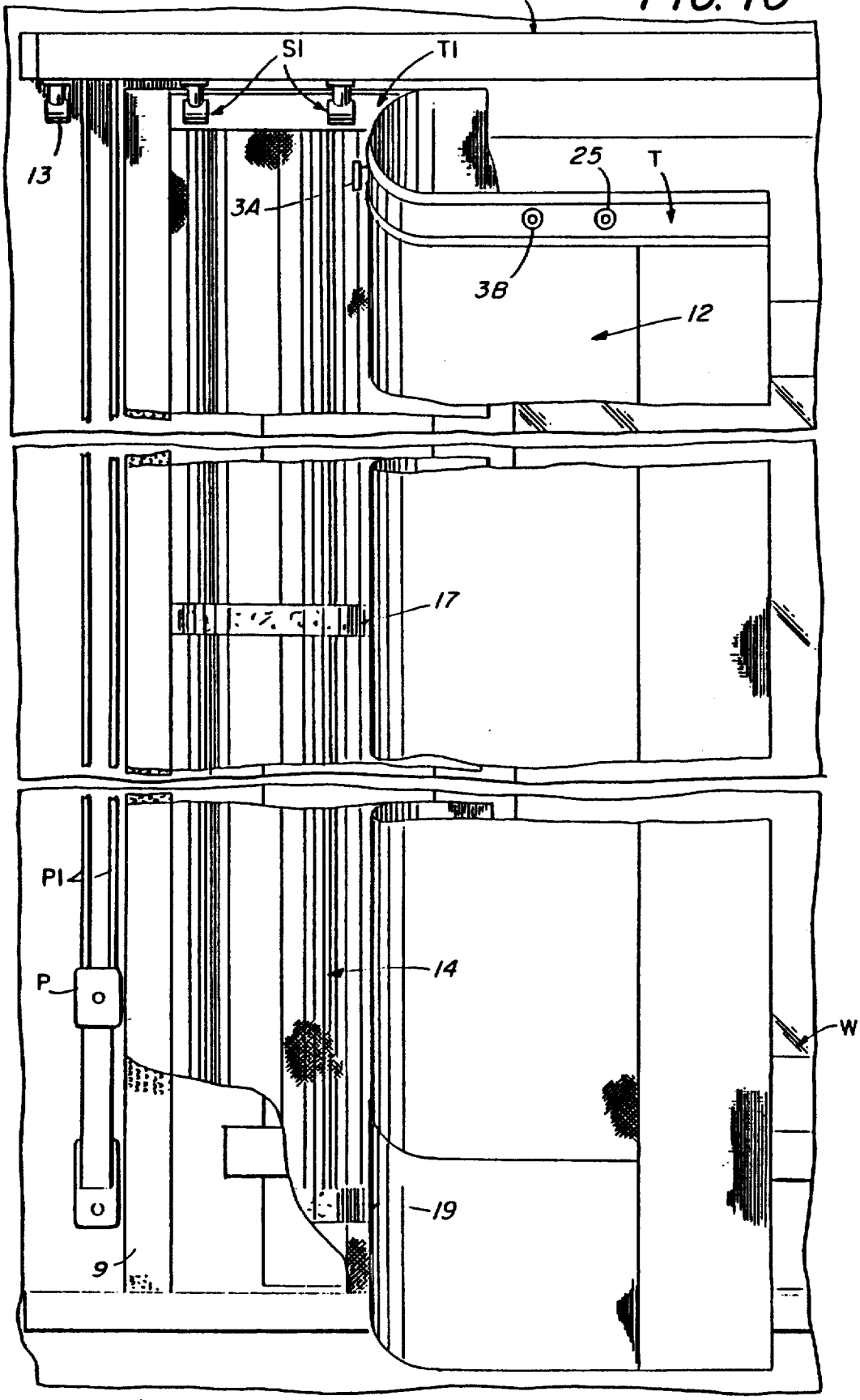
FIG. 10 is a perspective view of the panels with panel 12 folded back to show separator strips on panel 14.
Figure 11:
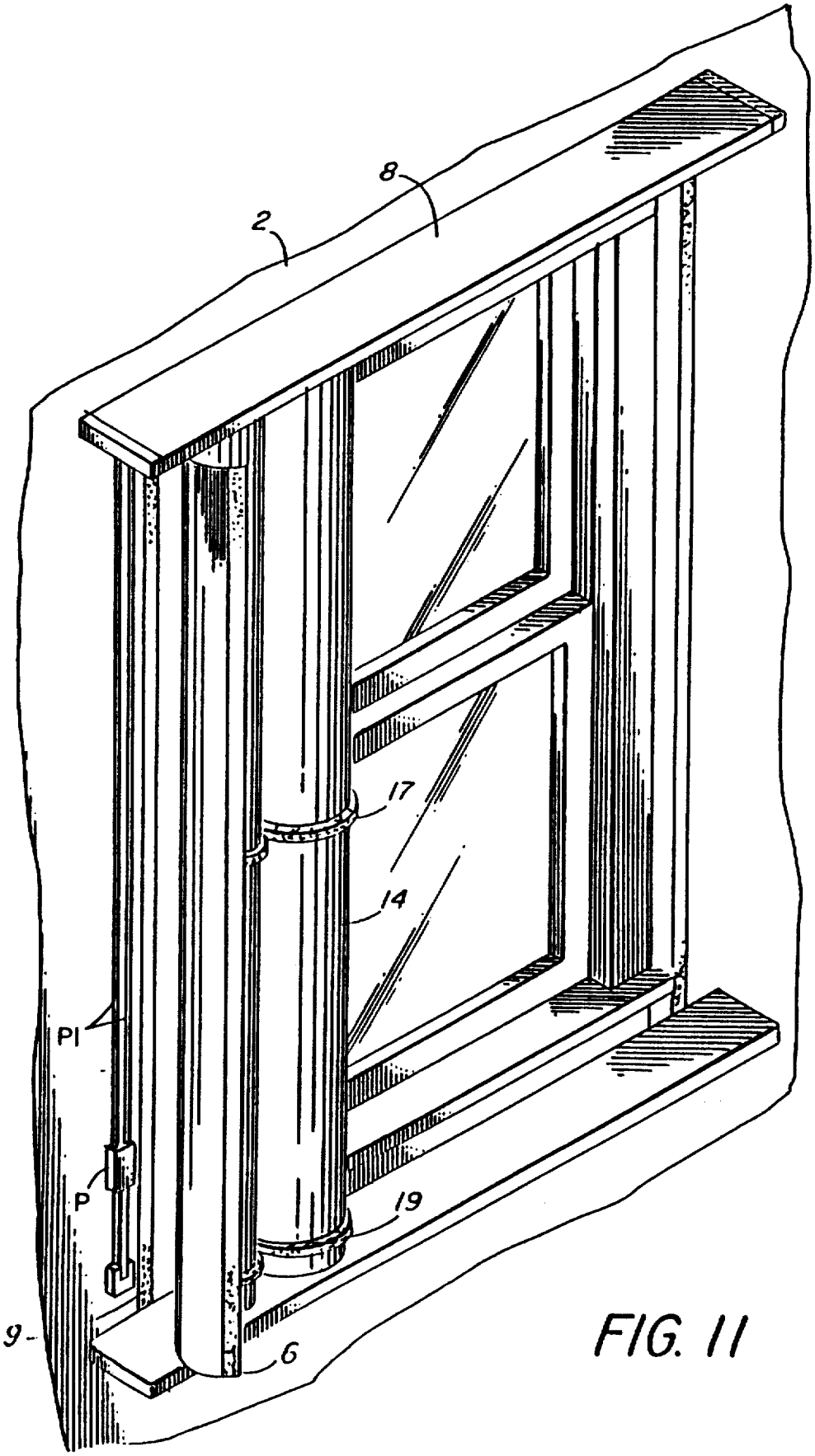
FIG. 11 is a perspective view of the inner panel and edge seal.

Considering first edge sealing, attention is directed to FIGS. 10 and 11. As shown therein, the panel 14 is attached by suitable Velcro TM fastening 6 along a side vertical edge (FIG. 11) to a strip of Velcro TM material 9 attached to a wall surface 2 (FIG. 11). In combination with this edge seal of the panel 14 there is further provided an extension of the outer panel 12 by locating an additional carrier 13 on the retaining rod 8A and for attachment therewith there is provided an additional snap fastening on tape T denoted by the numeral 25, as shown in FIG. 10. The snap fastening 25, when brought into attachment with carrier member 13, provides a space in which a pulley P and cords P1 may be received at a point outside the Velcro TM seal 6 of the panel 14 and inside the return of panel 12 therefore the edge seal of panel 14 may be maintained when it is desired to operate the pulley by reaching inside the panel 12 which hangs loosely adjacent to the wall (FIG. 9).

As shown in FIG. 2, the heat cap 8 is arranged in sealing relation to the wall 2 and lies in very close proximity to the top edges of the drapes when they are fastened together by snap fastenings. As a result, there is provided air baffle means by which circulation of air downwardly through and behind the curtains is substantially inhibited.

I claim:

1. A thermal drapery construction, comprising:

(a) retaining rod for locating drapery material adjacent to a wall surface;

(b) an inner panel of heat shielding fabric and an outer panel of drapery material spaced apart from each other;

(c) carrier members having opposing fasteners on their opposite sides and having a depth of at least 0.25 inch, the carrier members being interconnected by cords and mounted on the rod in sliding contact slidably supporting the panels in reversely folded relationship below the rod;

(d) fasteners secured in spaced apart relationship along the upper edge of each panel for fastening each panel to the carrier members, the fasteners along the upper edge of one panel being spaced a predetermined equal distance and the fasteners along the upper edge of the other panel being spaced alternating distances longer and shorter than the equal distance to compensate for different arcuate lengths of folds of the panels and thereby maintain a distance between panels at least 0.25 inch thereby providing an airspace between panels for insulation; and (e) separator means the same thickness as the airspace, located between the inner and outer panels, for maintaining the critical airspace at lower portions of the two panels.

2. A thermal drapery construction of claim 1, wherein the fasteners along the upper edge of the outer panel are spaced equal arcuate distances [$A^1$] $A_1$ and the fasteners along the upper edge of the inner panel are spaced alternate arcuate distances [$A^2$ and $A^3$, $A^2$ and $A^3$] $A_2$ *and* $A_3$, $A_2$ *and* $A_3$ being defined by the formula:

$$[A^2]A_2=\pi(R-S)$$

$$[A^3]A_3=\pi(R+S)$$

wherein S is the distance between panels and $R=[A^1/\pi,]$ $A_1/\pi$, and wherein the arcuate distances [$A^1$, $A^2$ and $A^3$] $A_1$, $A_2$ *and* $A_3$ refer to the drapery panels in reversely folded relationship on the rod.

3. A thermal drapery construction of claim 1, wherein the fasteners on the panels are snap fasteners mounted on a tape secured along the upper edge of each panel.

4. A thermal drapery construction of claim 1, wherein the heat shielding fabric is a metallized fabric.

5. A thermal drapery construction of claim 1, further comprising:

(f) a heat cap, having means for attachment to the wall surface, for receiving the retaining rod, the heat cap being located above the inner and outer panels in close proximity thereto;

(g) fastening means along the vertical outer edge of the inner panel for edge sealing the inner panel to a wall surface; and (h) means connected to the carrier members for advancing and retracting the panels along the rod.

6. A thermal drapery construction of claim 5, wherein the fastening means along the vertical outer edge of the inner panel is a hook fiber fastening tape or loop fiber fastening tape for fastening to loop fiber or hook fiber tape on the wall surface.

7. A thermal drapery construction of claim 5, wherein the advancing and retracting means is a cord and pulley system located outside of the edge seal.

8. A thermal drapery construction, comprising:

(a) a retaining rod for locating drapery material adjacent to a wall surface;

(b) an inner panel of heat shielding fabric and an outer panel of tightly woven drapery material;

(c) carrier members having opposing snap fasteners on their opposite sides and having a depth of 0.25 to about 0.5 inch, the carrier members being interconnected by cords and being mounted on the rod in sliding contact for slidably supporting the panels below the rod;

(d) snap fastening tapes secured along the upper edge of the inner and the outer panels, the snap fastening tapes having snap fastenings located in spaced apart relationship along the tape, the snap fastenings detachably securing the inner and the outer panel to the carrier members, the snap fastenings on the tape of one drapery panel being spaced equal distances along the tape and the snap fastenings on the tape of the other drapery panel being spaced apart compensating, alternating distances longer and shorter than the equal distance in order to maintain the inner and outer panels in a reversely folded relationship and uniformly apart from one another a distance of 0.25 inch to about 0.5 inch to provide an airspace between panels for insulation; and (e) horizontal separator strips of the same thickness as the airspace, located between the inner and outer panels intermediate and lower portions, the strips being fastened to one panel so as to extend into contact with the other panel to maintain uniformly the critical airspace at intermediate and lower portions of the two panels.

9. A thermal drapery construction of claim 8, wherein the snap fasteners on the tape of the inner panel are spaced alternate arcuate distances [$A^2$ and $A^3$, $A^2$ and $A^3$] $A_2$ *and* $A_3$, $A_2$ *and* $A_3$ being defined by the formulae:

[$A^2$] $A_2=\pi(R-S)$

[$A^3$] $A_3=\pi(R+S)$ wherein S is the distance between panels and $R=$[$A^1/\pi$, where $A^1$] $A_1/\pi$, *where* $A_1$ is the arcuate distance between fasteners on the tape of the outer panel.

10. A thermal drapery construction of claim 8, wherein carrier members are about 0.32 inch wide, the snap fasteners of the tape of the outer panel are located about 4.25 inches apart and the snap fasteners of the tape on the inner panel are located apart alternate distances of about 3.25 inches and 5.22 inches.

11. A thermal drapery construction of claim 8, wherein the heat shielding fabric is a metallized fabric.

12. A thermal drapery construction of claim 8, further comprising:

(f) a heat cap for receiving the retaining rod and located above the inner and outer panels in close proximity thereto;

(g) fastening means along the vertical outer edge of the inner panel for edge sealing the inner panel to a wall surface; and (h) means connected to the carrier members for advancing and retracting the panels along the rod.

13. A thermal drapery construction of claim 12, wherein the fastening means along the vertical outer edge of the inner panel is a hook fiber or loop fiber fastening tape for fastening to a loop fiber or hook fiber tape on the wall surface.

14. Drapery panels, fastened to carrier members, for mounting on a retaining rod in reversely folded relationship and spaced apart from each other, comprising:

(a) an outer panel of drapery material having fasteners secured a predetermined equal distance apart along the upper edge of the panel; and (b) an inner panel of heat shielding fabric having fasteners along the upper edge spaced at alternating distances longer and shorter than the predetermined distance to compensate for the different arcuate lengths of the folds of the panels when mounted on the rod and to provide a distance between panels of at least 0.25 inch.

15. Drapery panels of claim 14, wherein the fasteners along the upper edge of the inner panel are spaced alternate distances [$A^2$ and $A^3$, $A^2$ and $A^3$] $A_2$ *and* $A_3$, $A_2$ *and* $A_3$ being defined by the formulae:

[$A^2$] $A_2=\pi(R-s)$

[$A^3$] $A_3=\pi(R+S)$ wherein S is the distance between panels and $R=$[$A^1/\pi$ where $A^1$] $A_1/\pi$ *where* $A_1$ is the distance between fasteners on the tape of the outer panel.

16. Drapery panels of claim 14, wherein the distance between panels is from 0.25 to about 0.5 inch.

17. A thermal drapery construction, comprising:

(a) a retaining rod for locating drapery material adjacent to a wall surface;

(b) an inner panel of heat shielding fabric and an outer panel of tightly woven drapery material;

(c) carrier members having opposing snap fasteners on their opposite sides and having a carrier depth of 0.25 to about 0.5 inch, the carrier members being interconnected by cords and being mounted on the rod in sliding contact for slidably supporting the panels below the rod.

(d) snap fastening tapes secured along the upper edge of the inner and the outer panels, the snap fastening tapes having snap fastenings complementary to the fastenings on the carrier members and located in spaced apart relationship along the tape, the snap fastenings detachably securing the inner and the outer panel to the carrier members, the snap fastenings on the tape of one drapery panel being spaced equal distances along the tape and the snap fastenings on the tape of the other drapery panel being spaced apart compensating, alternating distances longer and shorter than the equal distance in order to maintain the inner and outer panels in a reversely folded relationship and uniformly apart from one another a distance of 0.25 inch to about 0.5 inch to provide an airspace between panels for insulation; and (e) horizontal separator strips of the same thickness as the airspace, located between the inner and outer panels at intermediate and lower portions thereof, the strips being fastened to one panel so as to extend into contact with the other panel to maintain uniformly the critical airspace at intermediate and lower portions of the two panels;

(f) a heat cap for receiving the retaining rod and located above the inner and outer panels in close proximity thereto;

(g) fastening means along the vertical edge of the inner panel for edge sealing the inner panel to a wall surface; and (h) a cord and pulley system for advancing and retracting the panels along the rod, the pulley being located outside the inner panel edge and inside the outer panel edge.

*18. A thermal drapery construction comprising:*

*a) a retaining rod for locating drapery material adjacent to a wall surface;*

*b) an inner panel comprising a fabric and an outer panel comprising a drapery material such that the inner and outer panels are spaced apart from each other;*

*c) carrier members having opposing fasteners on their opposite sides and having a depth of at least 0.25 inch, the carrier members being interconnected by cords and mounted on the rod in sliding contact slidably supporting the panels in reversely folded relationship below the rod;*

*d) fasteners secured in spaced apart relationship along the upper edge of each penal for fastening each panel to the carrier members, such that adjacent fasteners along the upper edge of one panel are spaced at a predetermined distance and the adjacent fasteners along the upper edge of the other panel are spaced alternating distances longer and shorter than the distance between the adjacent fasteners on the first panel to compensate for different arcuate lengths of folds of the panels and thereby maintain a distance between the fasteners of each panel of at least 0.25 inch thereby providing a space between panels for insulation; and*

*e) a separator located between the inner and outer panels that provides the insulation space between the two panels.*

*19. Drapery panels, fastened to carrier members, for mounting on a retaining rod in reversely folded relationship and spaced apart from each other, comprising:*

*(a) an outer panel comprising a drapery material and having fasteners secured at predetermined distances apart along the upper edge of the panel; and*

*(b) an inner panel comprising a heat shielding fabric and having fasteners along the upper edge spaced at alternating distances longer and shorter than the predetermined distance of the adjacent fasteners on the outer panel to compensate for the different arcuate lengths of the folds of the panels when mounted on the rod and such that there is a distance between the fasteners of each panel of at least 0.25 inch.*

*20. Drapery panels of claim 14, wherein the fasteners along the upper edge of the inner panel are spaced alternate distances $A_2$ and $A_3$, $A_2$ and $A_3$ being defined by the formulae:*

$$A_2=\pi(R-S)$$

*wherein S is the distance between panels and $R=A_1/\pi$- where $A_1$ is the distance between fasteners on a tape secured to the outer panel.*

*21. The drapery panels of claim 14 wherein the fasteners secured to the outer panel are spaced at an equal distance from each adjacent fastener on the outer panel.*

*22. Drapery panels, fastened to carrier members, for mounting on a retaining rod in reversely folded relationship and spaced apart from each other comprising:*

*(a) an outer panel comprising a drapery material and having fasteners secured at predetermined distances apart along the upper edge of the panel; and*

*(b) an inner panel comprising a heat shielding fabric and having fasteners along the upper edge spaced at alternating distances longer and shorter than the predetermined distance of the adjacent fasteners on the outer panel to compensate for the different arcuate lengths of the folds of the panels when mounted on the rod.*

*23. The drapery panels of claim 22 wherein an outer surface of the outer panel and an outer surface of the inner panel are at least 0.25 inch apart.*

* * * * *